(12) United States Patent
Shelkovin et al.

(10) Patent No.: US 9,998,885 B2
(45) Date of Patent: Jun. 12, 2018

(54) METHOD OF AND SYSTEM FOR PROCESSING AN ELECTRONIC MESSAGE DESTINED FOR AN ELECTRONIC DEVICE

(71) Applicant: YANDEX EUROPE AG, Lucerne (CH)

(72) Inventors: Aleksei Yuryevich Shelkovin, Moscow region (RU); Sergei Ivanovich Nikishin, Moscow region (RU)

(73) Assignee: Yandex Europe AG, Lucerne (CH)

( * ) Notice: Subject to any disclaimer, the term of this patent is extended or adjusted under 35 U.S.C. 154(b) by 0 days. days.

(21) Appl. No.: 15/503,020

(22) PCT Filed: Feb. 2, 2015

(86) PCT No.: PCT/IB2015/050793
§ 371 (c)(1),
(2) Date: Feb. 10, 2017

(87) PCT Pub. No.: WO2016/034951
PCT Pub. Date: Mar. 10, 2016

(65) Prior Publication Data
US 2017/0230806 A1    Aug. 10, 2017

(30) Foreign Application Priority Data
Sep. 2, 2014 (RU) .............................. 2014135646

(51) Int. Cl.
*H04M 1/725* (2006.01)
*H04W 4/12* (2009.01)
(Continued)

(52) U.S. Cl.
CPC .............. *H04W 4/12* (2013.01); *H04L 51/16* (2013.01); *H04L 51/24* (2013.01); *H04L 67/22* (2013.01)

(58) Field of Classification Search
CPC .... H04W 4/12; H04W 8/245; H04L 12/1895; H04L 51/16; H04L 51/24; H04L 67/22; H04M 1/72519
(Continued)

(56) References Cited

U.S. PATENT DOCUMENTS 6,763,384 B1    7/2004 Gupta et al.
7,209,916 B1    4/2007 Seshadri et al.
(Continued)

FOREIGN PATENT DOCUMENTS

RU    2480946 C2    4/2013
WO    2012018431 A1    2/2012
WO    2013032619 A1    3/2013

OTHER PUBLICATIONS

International Search Report from PCT/IB/2015/050789, dated Jun. 17, 2015, Blaine R. Copenheaver.
(Continued)

*Primary Examiner* — Danh Le
(74) *Attorney, Agent, or Firm* — BCF LLP

(57) ABSTRACT

There is disclosed a method, executable at a server, of processing an incoming message destined for a user, the user having first and second electronic devices, both the electronic devices executing at least one instance of an application. The method comprises receiving the incoming electronic message; based on a message type, appreciating a delivery preference parameter that is indicative of which one of the electronic devices the user is more likely to process the incoming electronic message of the message type; determining a specific electronic device having a highest delivery preference parameter, the specific one executing a first and a second instance of the application; based on the delivery preference parameter, determining a specific instance of the application the user is more likely to use for the incoming electronic message; generating a user-notification for the
(Continued)

message; transmitting the user-notification to the specific one of the instances of the application.

16 Claims, 5 Drawing Sheets

(51) Int. Cl.
*H04L 12/58* (2006.01)
*H04L 29/08* (2006.01)

(58) Field of Classification Search
USPC ............ 455/412.1, 567, 418, 550.1; 709/206
See application file for complete search history.

(56) References Cited

U.S. PATENT DOCUMENTS

| | | | |
|---|---|---|---|
| 7,543,319 B2 | 6/2009 | Ludvig et al. | |
| 7,603,421 B1 | 10/2009 | Roche et al. | |
| 8,681,664 B2 | 3/2014 | Razdan et al. | |
| 2007/0020880 A1 | 1/2007 | Mukai et al. | |
| 2007/0038599 A1 | 2/2007 | Pearson | |
| 2008/0019335 A1 | 1/2008 | Wallace et al. | |
| 2009/0013007 A1 | 1/2009 | Caner | |
| 2009/0027224 A1* | 1/2009 | Sugamura | F21V 33/0052 340/815.45 |
| 2011/0119337 A1* | 5/2011 | Bishop | G06Q 10/107 709/206 |
| 2011/0271202 A1 | 11/2011 | Wong et al. | |
| 2012/0300788 A1* | 11/2012 | Olshansky | H04L 12/4633 370/413 |
| 2013/0003260 A1 | 1/2013 | Kondou et al. | |
| 2013/0023112 A1 | 1/2013 | Santhanam | |
| 2013/0032592 A1 | 2/2013 | Lee | |
| 2013/0054706 A1 | 2/2013 | Graham et al. | |
| 2013/0159417 A1 | 6/2013 | Meckler et al. | |
| 2014/0025749 A1* | 1/2014 | Glowacki | H04L 12/1895 709/206 |
| 2014/0025758 A1* | 1/2014 | Glowacki | H04L 12/1895 709/206 |
| 2014/0057610 A1* | 2/2014 | Olincy | H04W 4/16 455/414.1 |
| 2014/0207957 A1* | 7/2014 | Zhang | H04L 67/02 709/227 |
| 2015/0341290 A1* | 11/2015 | Cherifi | H04L 51/043 709/206 |
| 2016/0057505 A1* | 2/2016 | Gavade | H04N 21/4882 725/33 |

OTHER PUBLICATIONS

Govan, Temporal Analysis of an iMessage Communication Exchange, School of Engineering & Built Environment, Glasgow Caledonian University, Scotland, 2013, 9 pages.
U.S. Appl. No. 15/503,019.

* cited by examiner

METHOD OF AND SYSTEM FOR PROCESSING AN ELECTRONIC MESSAGE DESTINED FOR AN ELECTRONIC DEVICE

CROSS-REFERENCE

The present application claims priority to Russian Patent Application No. 2014135646, filed Sep. 2, 2014, entitled "METHOD OF AND A SYSTEM FOR PROCESSING AN ELECTRONIC MESSAGE DESTINED FOR AN ELECTRONIC DEVICE" the entirety of which is incorporated herein.

FIELD OF THE TECHNOLOGY

The present technology relates to electronic communications over a communication network in general and, specifically, to a method of and a system for processing an electronic message destined for an electronic device.

BACKGROUND

The recent developments in telecommunications network have provided a typical user with a choice of a plethora of communication applications for exchanging information with other users over a telecommunication network. The typical user can select a specific way to interchange information over the telecommunication network, which specific way may depend on one or both of the typical user's personal preferences or the type of information she is desirous of exchanging.

For example, the user can choose and send an e-mail using an e-mail client or a webmail application. The e-mail client or the webmail application allow the user to send an email message that includes various types of data (for example, both text and attachments—such as, images, financial worksheets, multi-media presentations, audio files, video files and the like). The e-mail message provides the user with flexibility to choose virtually any length of the e-mail message and a virtually any number of attachments (subject only to the e-mail size limitations potentially imposed by the e-mail service provider that the user chooses to use).

As another example, the user can send a short electronic message. For example, devices provided by Apple Corporation of 1 Infinite Loop, Cupertino, Calif., United States of America (such as the iPhone™ and the iPad™ device) allow the user to send iMessages to other users of devices provided by Apple Corporation that have the iMessages function enabled thereupon. Other devices, allow the user to send the short electronic message over the wireless network, which short electronic message is also called sometimes a text message.

As another example, the user can engage in a so-called "electronic chat". There are various applications available to the user to conduct such the electronic chat. For example, Skype™ Messenger application provided by Skype Technologies S.A. (a Microsoft Corporation) allows the user to engage in the electronic chat with one or more other users. As an example, the Skype Messenger allows the user to send text messages, share files, share desktop views and the like. The Skype Messenger also allows the user to engage in a two way voice conversation or in a two-way video conversation. With some subscription packages, the Skype Messenger also allows for three-way and multi-group voice or video conferencing.

A typical user these days has access to more than one electronic device. For example, the user may have access to a work laptop, a home computer, a wireless smart phone and a tablet computer. The user may use all these different electronic devices for different purposes. For example, the user may use the work laptop for work related tasks, while using the home computer for personal tasks. However, the user may use one or more of the electronic devices for shared purposes. As such, the user may have the same application installed on multiple of the devices and can engage into the same conversations using the same log in credentials on the multiple electronic devices.

For example, the user may have installed the Skype messenger on all of its available electronic devices and the user may choose to log in using the same credentials onto the Skype Messenger application on all of these electronic devices. As such, the user may be able to engage into the Skype Messenger conversation with one or more of her registered co-users using any one of the electronic devices.

Some of the electronic messaging systems make use of presence information that reports a user's willingness (e.g., do not disturb, busy and inactive, busy, etc.) and availability (e.g., away, inactive, available, etc.) to communicate. Ordinarily, a user's presence is associated with an endpoint such as a personal computer or a mobile device (e.g., a smartphone), which supports a client application based on an electronic messaging protocol supported by an electronic messaging service.

When a user opens and signs onto such a client application, a server application for the electronic messaging service records the user's status as willing and available to communicate and broadcast this status to any other open interested client applications (e.g., those associated with a user's contact list, friend list, buddy list, etc.). Then later, if there is a lack of user-related activity at the device associated with the client application, the client application typically reports this lack of activity to the corresponding server application and the server application will record and broadcast the user's status as inactive.

Many electronic messaging systems support multiple points of presence (MPOP). In some MPOP systems, a user can simultaneously open and sign onto multiple client applications at multiple endpoints. When an instant message is received by a server application in such a system, there are various design alternatives for transmitting the instant message to the user at the multiple open endpoints. The typical prior art approach is to simply transmit the instant message to all of them.

US patent application 20110271202 published on Nov. 3, 2011 to Wong et al teaches a server application for an instant messaging service that opens a first connection with a first client application executing on a device, after receiving a login from the first client application. Next the server application opens a second connection with a second client application, after receiving the same login from the second client application. Then the server application receives an instant message associated with the login and determines whether the first client application is in a network idle state following a period of idle time. If the first client application is in the network idle state, the server application causes a notification as to the receipt of the instant message to be displayed on a user interface for the second client application. The displayed notification might also be accompanied by an aural notification or a haptic alert. It is noted that Wong et al teaches that, after a period of time without activity detected by the peripheral devices connected to the personal computer, the client application running on the personal computer reports a network-idle status to the server application for the instant-messaging service, which is then used as the indication of the idle status.

WO patent application 2012/018431 published on Feb. 9, 2012 teaches systems and methods for prediction of activity session for mobile network use optimization and user experience enhancement. In one aspect, embodiments of the present disclosure include a method, which may be implemented on a system for enhancing user experience with a mobile application on a mobile device including, using user activity characteristics at a mobile device and server activity characteristics of a host server to anticipate a future activity session at the mobile device and transferring impending content from the host server the mobile device to pre-cache content on the mobile device to support predicted data activity for the future activity session that has been predicted.

US patent application 2009/0013007 published on Jan. 8, 2009 to Caner discloses a method of handling log files in a network with multiple servers, including, installing an agent application on each server in the network, collecting log files on each server by the agent application, defining a uniform format for providing the log files to a central server, transforming the log files to the defined uniform format, transmitting the transformed log files to a central server, storing the log files in an archive by the central server, analyzing the log files received by the central server, producing reports responsive to the analysis of the log files.

US patent application 2007/0038599 published on Feb. 15, 2007 to Pearson discloses a portal that uses portlets to provide a session to a user. Based on portlet events that occur in the session, portlet log entries are sent from the portlets to a log server. The log server stores log entries comprising the portlet log entries and the portal log entries. A customer service representative in communication with the user is provided a display of an activity of the user in the session based on the log entries from the log server.

U.S. Pat. No. 6,763,384 issued on Jul. 13, 2004 to Gupta et al is directed to internet services that rely on the transfer of real-time information. Given the amount of information generated on the Internet, a user may request to be notified whenever particular information becomes available, such as the current highest bid in an on-line auction. The user enrols to receive one or more messages and sends a list of desired messages through a client process running on the user's computer system. When the user is ready to receive messages, the client process connects to a notification server and provides its receiving address identifier. It then disconnects from the notification server and waits for messages. A message monitor detects the occurrence of events that trigger notifications, and informs the notification server of the event. The notification server determines the appropriate recipient for the notification, and sends it using a server-initiated end-to-end message transfer mechanism to the clients' receiving address identifiers. The notification can also be used as a control signal to control one or more applications, or to control an appliance remotely over a network. The notification server may make use of load-sharing devices or proxy servers to distribute the notification to the client processes.

U.S. Pat. No. 7,543,319 issued on Jun. 2, 2009 to Ludvig et al discloses Notification data is received and stored at a client device. A notice represented by the notification data is then displayed to the television viewer when a channel change event is detected. The notification data may also include data that indicates how the notice is to be displayed.

US patent application 2011/0271202 published on Nov. 3, 2011 to Wong et al discloses a server application for an instant messaging service opens a first connection with a first client application executing on a device, after receiving a login from the first client application. Next the server application opens a second connection with a second client application, after receiving the same login from the second client application. Then the server application receives an instant message associated with the login and determines whether the first client application is in a network idle state following a period of idle time. If the first client application is in the network idle state, the server application causes a notification as to the receipt of the instant message to be displayed on a user interface for the second client application. The displayed notification might also be accompanied by an aural notification or a haptic alert.

SUMMARY

It is thus an object of the present technology to ameliorate at least some of the inconveniences present in the prior art.

Inventors of the present technology have developed embodiments thereof based on their realization of at least one technical problem associated with the prior art solutions. Let's take the class of prior art solutions where the notification of an incoming electronic message destined to the user is delivered to every electronic device associated with a client application where the user is logged in. Within this class of prior art solutions, each of the electronic devices has to receive and process the notification of the incoming electronic message. This places undue burden on both the network resources (for having to deliver multiple copies of the notification) and the processing resources of each of the electronic devices themselves for having to process potentially redundant copies of the notification.

Let's take the class of prior art solutions where the notification of an incoming electronic message destined to the user is delivered to only those electronic devices associated with a client application where the user is logged in and the status of which client applications is set as "active". Within this class of prior art solutions, in order for the solution to work properly, each of the electronic devices where the client application enters an idle state needs to be able to report the idle state to the server responsible for the electronic messaging service.

As one may appreciate each of the electronic devices may have different networks it may be able to connect to. For example, a typical tablet may be able to connect to both a WiFi network and a cellular network. Even though the tablet may be able to connect to both the WiFi network and the cellular network, some users may choose not to use the cellular network (due to the cost and the like). Within these scenarios, if the tablet is moved to an area where there is no WiFi coverage, the tablet may not be able to report its state to the server. Therefore, the server will erroneously consider the tablet to be in an active state, thus attempting to deliver notification messages associated with incoming electronic messages to the tablet. Again, this situation places an unnecessary burden on the network resource between the server and the one or more electronic devices associated with the user.

Finally, these multiple notifications on multiple instance of electronic device that executes the application may lead to multiple notifications being displayed on multiple electronic devices, effectively overloading the user with the information. The user may be disadvantaged by either having to sieve through all the notifications and select those that are truly associated with the new incoming electronic message. Alternatively, the user may simply close all the notifications without properly reviewing them, thus, potentially causing the user not to appreciate the newly received electronic message in a timely manner.

According to a first broad aspect of the present technology, there is provided a method of processing an incoming electronic message destined to an application associated with a user, the user being associated with a first electronic device and a second electronic device, both the first electronic device and the second electronic device executing an instance of the application. The method is executable at a server being responsible for handling incoming electronic messages for the application. The method comprises: receiving, by the server, the incoming electronic message destined for the user; retrieving, by the server, a user-activity-log associated with user activity using a first instance of the application on the first electronic device and a second instance of the application on the second electronic device; based on the user-activity-log, determining, by the server, a specific one of the first electronic device and the second electronic device that is associated with the most recent user activity within the first application; generating, by the server, a user-notification associated with the incoming electronic message; transmitting, by the server, via the communication network the user-notification to the specific one of the first electronic device and the second electronic device.

In some implementations of the method, the user-notification is an active user notification comprising (i) the incoming message and (ii) a trigger operable to cause the electronic device to provide a notification of the incoming message to the user.

In some implementations of the method, the notification is at least one of a visual notification and an audible notification.

In some implementations of the method, the user-notification is a first user-notification, the method further comprising transmitting, by the server, via the communication network, a second user-notification to another one of the first electronic device and the second electronic device, the second user-notification of a different type from the first user-notification.

In some implementations of the method, the first user-notification being an active user notification comprising (i) the incoming message and (ii) a trigger operable to cause the electronic device to provide a notification of the incoming message to the user and the second user-notification being a passive user notification comprising (i) the incoming message for background uploading to the application.

In some implementations of the method, the method further comprises maintaining, by the server, the user-activity-log.

In some implementations of the method, the maintaining comprises appreciating a first activity parameter associated with the first instance of the application and a second activity parameter associated with the second instance of the application.

In some implementations of the method, the first activity parameter comprises one of sending an outgoing electronic message and receiving an incoming electronic message.

In some implementations of the method, first activity parameter comprises organizing electronic messages within the first instance of the application.

In some implementations of the method, the second activity parameter comprises one of sending an outgoing electronic message and receiving an incoming electronic message.

In some implementations of the method, the second activity parameter comprises organizing electronic messages within the second instance of the application.

In some implementations of the method, the method further comprises: responsive to an absence of an action in response to the user-notification, transmitting, by the server, a copy of the user-notification to another one of the first electronic device and the second electronic device.

In some implementations of the method, the absence of the action is determined in response to a lapse of a predetermined period of time without the action in response to the user-notification.

In some implementations of the method, the copy of the user-notification is of the same type as the user-notification.

In some implementations of the method, both the user-notification and the copy of the user notification comprise (i) the incoming electronic message and (ii) a trigger operable to cause the electronic device to provide a notification of the incoming electronic message to the user.

In some implementations of the method, the copy of the user-notification is of a different type as the user-notification.

In some implementations of the method, the user-notification is an active user notification comprising (i) the incoming electronic message and (ii) a trigger operable to cause the electronic device to provide a notification of the incoming electronic message to the user and the copy of the user-notification is a passive user notification comprising (i) the incoming electronic message for background uploading to the application.

In some implementations of the method, the application is a first application client, the method further comprising responsive to an absence of an action in response to the user-notification, transmitting, by the server, a copy of the user-notification to a second application client executed on the one of the first electronic device and the second electronic device.

In some implementations of the method, the method further comprises: responsive to an absence of an action in response to the user notification transmitted to the second application client, transmitting, by the server, a copy of the user-notification to another one of the first electronic device and the second electronic device.

In some implementations of the method, the absence of an action is determined solely based on lack of action on the application executed on the specific one of the first electronic device and the second electronic device.

In some implementations of the method, the absence of an action is determined based on lack of action on both the application executed on the specific one of the first electronic device and the second electronic device and the application executed on the other one of the first electronic device and the second electronic device.

According to another broad aspect of the present technology, there is provided a server. The server comprises: a communication interface for communication with an electronic device via a communication network, a processor operationally connected with the communication interface, the processor configured to process an incoming electronic message destined to an application associated with a user, the user being associated with a first electronic device and a second electronic device, both the first electronic device and the second electronic device executing an instance of the application. The processor is further configured to: receive the incoming electronic message destined for the user; retrieve by the server, a user-activity-log associated with user activity using a first instance of the application on the first electronic device and a second instance of the application on the second electronic device; based on the user-activity-log, determine a specific one of the first electronic device and the second electronic device that is associated with the most recent user activity within the first application; generate a user-notification associated with the incoming electronic message; transmit, via the communication interface, the user-notification to the specific one of the first electronic device and the second electronic device.

In some implementations of the server, the user-notification is an active user notification comprising (i) the incoming message and (ii) a trigger operable to cause the electronic device to provide a notification of the incoming message to the user.

In some implementations of the server, the notification is at least one of a visual notification and an audible notification.

In some implementations of the server, the user-notification is a first user-notification, the processor is further configured to transmit, via the communication interface, a second user-notification to another one of the first electronic device and the second electronic device, the second user-notification of a different type from the first user-notification.

In some implementations of the server, the first user-notification being an active user notification comprising (i) the incoming message and (ii) a trigger operable to cause the electronic device to provide a notification of the incoming message to the user and the second user-notification being a passive user notification comprising (i) the incoming message for background uploading to the application.

In some implementations of the server, the processor is further operable to maintain the user-activity-log.

In some implementations of the server, to maintain the user-activity-log, the processor is operable to appreciate a first activity parameter associated with the first instance of the application and a second activity parameter associated with the second instance of the application.

In some implementations of the server, the first activity parameter comprises one of sending an outgoing electronic message and receiving an incoming electronic message.

In some implementations of the server, the first activity parameter comprises organizing electronic messages within the first instance of the application.

In some implementations of the server, the second activity parameter comprises one of sending an outgoing electronic message and receiving an incoming electronic message.

In some implementations of the server, the second activity parameter comprises organizing electronic messages within the second instance of the application.

In some implementations of the server, the processor being further operation to: responsive to an absence of an action in response to the user-notification, transmit a copy of the user-notification to another one of the first electronic device and the second electronic device.

In some implementations of the server, the absence of the action is determined in response to a lapse of a predetermined period of time without the action in response to the user-notification.

In some implementations of the server, the copy of the user-notification is of the same type as the user-notification.

In some implementations of the server, both the user-notification and the copy of the user notification comprise (i) the incoming electronic message and (ii) a trigger operable to cause the electronic device to provide a notification of the incoming electronic message to the user.

In some implementations of the server, the copy of the user-notification is of a different type as the user-notification.

In some implementations of the server, the user-notification is an active user notification comprising (i) the incoming electronic message and (ii) a trigger operable to cause the electronic device to provide a notification of the incoming electronic message to the user and the copy of the user-notification is a passive user notification comprising (i) the incoming electronic message for background uploading to the application.

In some implementations of the server, the application is a first application client, the processor being further operable, responsive to an absence of an action in response to the user-notification, to transmit a copy of the user-notification to a second application client executed on the one of the first electronic device and the second electronic device.

In some implementations of the server, the processor being further operable: responsive to an absence of an action in response to the user-notification transmitted to the second application client, to transmit a copy of the user-notification to another one of the first electronic device and the second electronic device.

In some implementations of the server, the absence of an action is determined solely based on lack of action on the application executed on the specific one of the first electronic device and the second electronic device.

In some implementations of the server, the absence of an action is determined based on lack of action on both the application executed on the specific one of the first electronic device and the second electronic device and the application executed on the other one of the first electronic device and the second electronic device.

According to another broad aspect of the present technology, there is provided a method of processing an incoming electronic message destined to an application associated with a user, the user being associated with a first electronic device and a second electronic device, both the first electronic device and the second electronic device executing an instance of the application. The method is executable at a server being responsible for handling incoming electronic messages for the application. The method comprises: receiving, by the server, the incoming electronic message destined for the user; based on a message type of the incoming electronic message, appreciating a delivery preference parameter associated with the user, the delivery preference parameter being indicative of user past-behaviour indicative of which one of the first electronic device and the second electronic device the user is more likely to process the incoming electronic message of the message type; based on the delivery preference parameter, determining, by the server, a specific one of the first electronic device and the second electronic device that is associated with a highest one of the delivery preference parameter; generating, by the server, a user-notification associated with the incoming electronic message; transmitting, by the server, via the communication network the user-notification to the specific one of the first electronic device and the second electronic device.

In some implementations of the method, the user-notification is an active user notification comprising (i) the incoming message and (ii) a trigger operable to cause the electronic device to provide a notification of the incoming message to the user.

In some implementations of the method, the notification is at least one of a visual notification and an audible notification.

In some implementations of the method, the method further comprises maintaining, by the server, a log of the user past-behaviour.

In some implementations of the method, the method further comprises: responsive to an absence of an action in response to the user-notification, transmitting, by the server, a copy of the user-notification to another one of the first electronic device and the second electronic device.

In some implementations of the method, the absence of the action is determined in response to a lapse of a predetermined period of time without the action in response to the user-notification.

In some implementations of the method, the copy of the user-notification is of the same type as the user-notification.

In some implementations of the method, both the user-notification and the copy of the user notification comprise (i) the incoming electronic message and (ii) a trigger operable to cause the electronic device to provide a notification of the incoming electronic message to the user.

In some implementations of the method, the copy of the user-notification is of a different type as the user-notification.

In some implementations of the method, the user-notification is an active user notification comprising (i) the incoming electronic message and (ii) a trigger operable to cause the electronic device to provide a notification of the incoming electronic message to the user and the copy of the user-notification is a passive user notification comprising (i) the incoming electronic message for background uploading to the application.

In some implementations of the method, the application is a first application client, the method further comprising responsive to an absence of an action in response to the user-notification, transmitting, by the server, a copy of the user-notification to a second application client executed on the specific one of the first electronic device and the second electronic device.

In some implementations of the method, the method further comprises: responsive to an absence of an action in response to the user-notification transmitted to the second application client, transmitting, by the server, a copy of the user-notification to another one of the first electronic device and the second electronic device.

In some implementations of the method, the absence of an action is determined solely based on lack of action on the first application client and the second application client executed on the specific one of the first electronic device and the second electronic device.

In some implementations of the method, the absence of an action is determined based on lack of action on both the first application client and the second application client executed on the specific one of the first electronic device and the second electronic device and the application executed on the other one of the first electronic device and the second electronic device.

In accordance with another broad aspect of the present technology, there is provided a server. The server comprises: a communication interface for communication with an electronic device via a communication network, a processor operationally connected with the communication interface, the processor configured to process an incoming electronic message destined to an application associated with a user, the user being associated with a first electronic device and a second electronic device, both the first electronic device and the second electronic device executing an instance of the application, the processor being further configured to: receive the incoming electronic message destined for the user; based on a message type of the incoming electronic message, to appreciate a delivery preference parameter associated with the user, the delivery preference parameter being indicative of user past-behaviour indicative of which one of the first electronic device and the second electronic device the user is more likely to process the incoming electronic message of the message type; based on the delivery preference parameter, to determine a specific one of the first electronic device and the second electronic device that is associated with a highest one of the delivery preference parameter; generate a user-notification associated with the incoming electronic message; transmit, via the communication interface, the user-notification to the specific one of the first electronic device and the second electronic device.

In some implementations of the server, the user-notification is an active user notification comprising (i) the incoming message and (ii) a trigger operable to cause the electronic device to provide a notification of the incoming message to the user.

In some implementations of the server, the notification is at least one of a visual notification and an audible notification.

In some implementations of the server, the processor is further operable to maintain a log of the user past-behaviour.

In some implementations of the server, the processor being is operable to, responsive to an absence of an action in response to the user-notification, transmit a copy of the user-notification to another one of the first electronic device and the second electronic device.

In some implementations of the server, the absence of the action is determined in response to a lapse of a predetermined period of time without the action in response to the user-notification.

In some implementations of the server, the copy of the user-notification is of the same type as the user-notification.

In some implementations of the server, both the user-notification and the copy of the user notification comprise (i) the incoming electronic message and (ii) a trigger operable to cause the electronic device to provide a notification of the incoming electronic message to the user.

In some implementations of the server, the copy of the user-notification is of a different type as the user-notification.

In some implementations of the server, the user-notification is an active user notification comprising (i) the incoming electronic message and (ii) a trigger operable to cause the electronic device to provide a notification of the incoming electronic message to the user and the copy of the user-notification is a passive user notification comprising (i) the incoming electronic message for background uploading to the application.

In some implementations of the server, the application is a first application client, the processor being further operable, responsive to an absence of an action in response to the user-notification, to transmit a copy of the user-notification to a second application client executed on the specific one of the first electronic device and the second electronic device.

In some implementations of the server, the processor is further operable, responsive to an absence of an action in response to the user-notification transmitted to the second application client, to transmit a copy of the user-notification to another one of the first electronic device and the second electronic device.

In some implementations of the server, the absence of an action is determined solely based on lack of action on the first application client and the second application client executed on the specific one of the first electronic device and the second electronic device.

In some implementations of the server, the absence of an action is determined based on lack of action on both the first application client and the second application client executed on the specific one of the first electronic device and the second electronic device and the application executed on the other one of the first electronic device and the second electronic device.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless specifically provided otherwise, the words "active notification" have been used to denote a notification associated with an incoming electronic message that actively announces to the user the fact of the incoming electronic message in addition to the new incoming electronic message appearing in the user interface of the electronic messaging application. This active notification can be a visual notification, such as a pop-up window that appears on the screen irrespective of which application or screen is currently active. This active notification can be an audible signal associated with the incoming electronic message. The active notification can be a tangible signal, such as vibration of a smart phone. Naturally, the active notification can be a combination of these or other types of active notifications.

FIG. 3 depicts several examples of active notifications that can be provided in association of incoming electronic messages. Active notification 302 is an example of the user notification provided in OUTLOOK™ mail client. Active notification 304 is an example of the user notification provided in GMAIL™ webmail account. Active notification 306 is an example of the user notification provided by the operating system command line. Within the latter example, the active notification 306 includes a graphical notification 308 indicative of a presence of the new incoming electronic message and a summary pop up window 310 indicative of a number of incoming electronic messages and a summary of one or more of the new incoming electronic messages.

In the context of the present specification, unless specifically provided otherwise, the words "passive notification" have been used to denote lack of active notification or, in other words, when the new incoming message is loaded into the interface of the electronic messaging application without announcing the fact of the arrival of the incoming electronic message. Naturally, within the interface of the electronic messaging application, the new electronic message can be highlighted, as per native rules of the electronic messaging application (such as being presented in bold font or highlighted in a different color).

FIG. 4 is an example screenshot of a conventional webmail page illustrating one embodiment of passive notifications. A webmail page 400 is viewable on a terminal of an email receiver, for example on a browser. The webmail page 400 shows a plurality of lines 402 that, together, form a list of recent email messages addressed to the email receiver. Each line 402 provides information about a particular email message. More specifically, each line 402 shows an identity 404 of a sender of the email message, a title 406 of the email message, and a date or time 408 when the email message was sent from the sender. A small picture 414 representing the sender may be included, if available (otherwise a filler image may be displayed). First few words 410 of a text content of the email message (or a compiled summary of the e-mail message) may also be shown. On each line 402, a box 412 can be selected by the email receiver to execute an action chosen by clicking on a command related to the email message. Line 402A shows an icon 420, usually illustrating a paper clip, indicating that a particular email message contains one or more attachments. The content of a given line 402 are displayed in bold font when the corresponding email message has not been previously opened by the email receiver. The content of a given line 402 that is not in bold font indicates that it refers to an email message that has already been opened by the email receiver. The first two lines 402 are depicted in bold font, illustrative of the two new (i.e. unread) messages being received for the user associated with the webmail account. Within this illustration the two new messages that are displayed in bold but without an active notification are deemed to be passive notifications within the meaning of this disclosure.

In the context of the present specification, unless specifically provided otherwise, the words "user activity" have been used to denote active interaction of the user with the electronic messaging application. User activity can include one or more of: user logging into the electronic messaging application, user scrolling through the electronic messages using the electronic messaging application, replying to an electronic message in the electronic messaging application, deleting the electronic message in the electronic messaging application, organizing electronic messages in the electronic messaging application and the like.

In the context of the present specification, unless specifically provided otherwise, the word "client" has been used to denote a type of the electronic messaging application. For example, within the example of the electronic messaging application being an e-mail application, the client may be: a web interface, an Internet Message Access Protocol (IMAP) client, mobile application and the like.

In the context of the present specification, unless specifically provided otherwise, the words "client instance" or "instances of the client" have been used to denote several instances of the same client executed on the same electronic device. Continuing with the above example of the e-mail application, the client instances may be embodied in: several tabs in a browser, each tab being associated with the instance of the web mail client; several IMAP clients executed on the same electronic device; and the like.

In the context of the present specification, unless specifically provided otherwise, the words "application session" have been used to denote a communication channel established between each instance of the communication client and a server responsible for managing incoming and outgoing communication using the application client(s), the communication channel specifically configured or being usable for transmitting trigger suitable for causing clients to provide user notifications (active or passive).

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
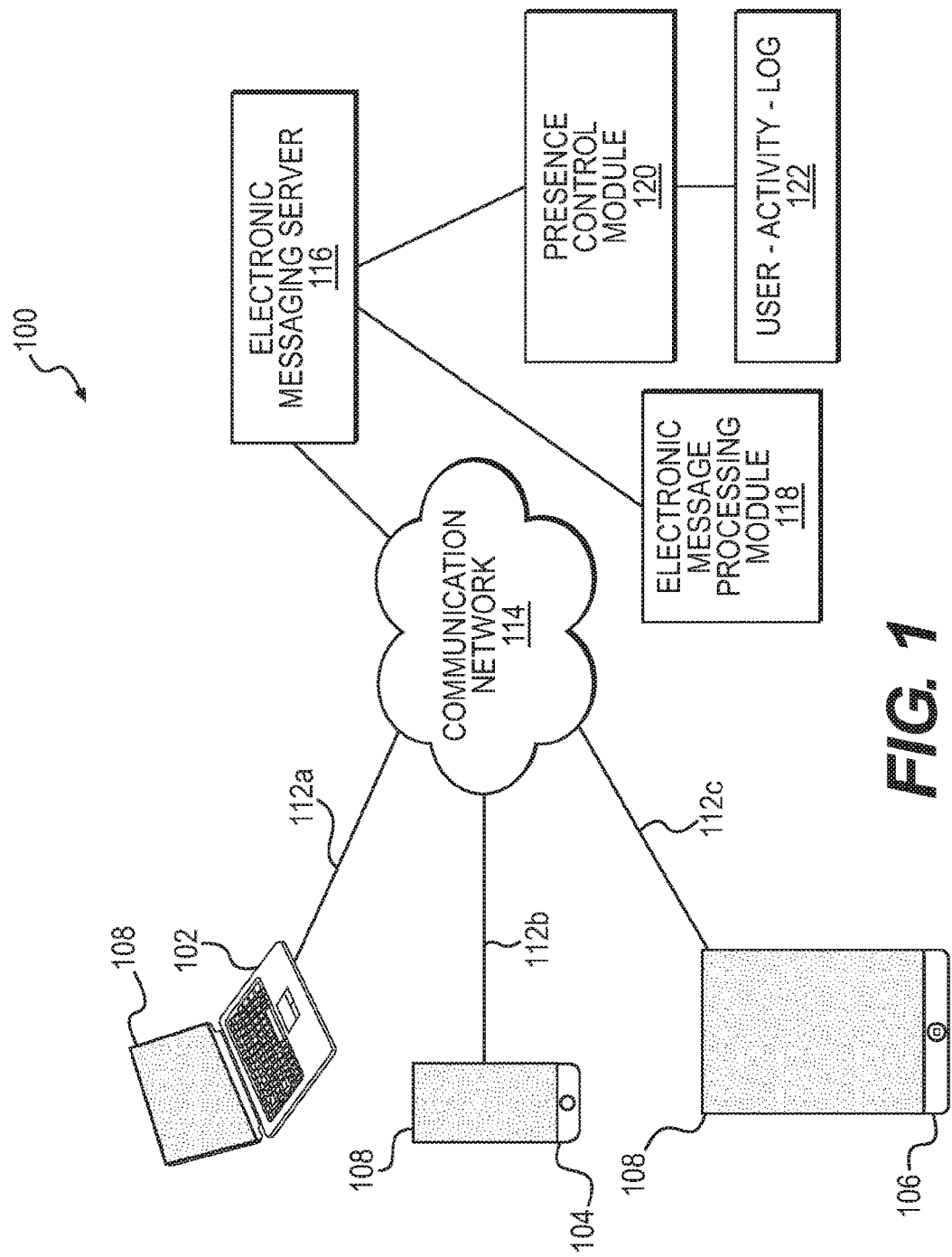
FIG. 1 is a schematic diagram of a system 100 implemented in accordance with an embodiment of the present technology.

Referring to FIG. 1, there is shown a diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a first electronic device 102. The first electronic device 102 is typically associated with a user (not depicted) and, as such, can sometimes be referred to as a "client device". It should be noted that the fact that the first electronic device 102 is associated with the user does not need to suggest or imply any mode of operation—such as a need to log in, a need to be registered or the like.

The implementation of the first electronic device 102 is not particularly limited, but as an example, the first electronic device 102 may be implemented as a personal computer (desktops, laptops, netbooks, etc.), a wireless electronic device (a cell phone, a smartphone, a tablet and the like), as well as network equipment (a router, a switch, or a gateway). Merely for the purposes of an illustration, it shall be assumed that the first electronic device 102 is implemented as a laptop computer, such as LENOVO™ THINK-PAD™ X220 lap top running a WINDOWS™ operating system.

The first electronic device 102 comprises hardware and/or software and/or firmware (or a combination thereof) to execute an electronic messaging application 108. Generally speaking, the purpose of the electronic messaging application 108 is to enable the user (not depicted) to execute exchange of electronic messages with other users of the electronic messaging application 108. How the electronic messaging application 108 is implemented is not particularly limited. One example of the electronic messaging application 108 may be an e-mail client (such as a webmail application or a locally executed client). Another example of the electronic messaging application 108 may be a instant messaging application. Yet another example of the electronic messaging application 108 may be a Voice-over-IP application. For the purposes of the description to be provided below, it shall be assumed that the electronic messaging application 108 is executed as a webmail application. However, it is expected that those skilled in the art will be able to adapt teachings presented herein to other types of the electronic messaging application.

For example, the electronic messaging application 108 can be accessed by typing in an URL associated with Yandex webmail service. It should be expressly understood that the electronic messaging application 108 can be accessed using any other commercially available or proprietary search engine.

The system 100 comprises a second electronic device 104. The second electronic device 104 is also associated with the same user as the first electronic device 102. The implementation of the second electronic device 104 is also not particularly limited, but as an example, the second electronic device 104 may be implemented as a personal computer (desktops, laptops, netbooks, etc.), a wireless electronic device (a cell phone, a smartphone, a tablet and the like), as well as network equipment (a router, a switch, or a gateway). Merely for the purposes of an illustration, it shall be assumed that the second electronic device 104 is implemented as a smartphone computer, such as iPhone 5™ provided by Apple Corporation.

The second electronic device 104 also comprises hardware and/or software and/or firmware (or a combination thereof) to execute the electronic messaging application 108.

The system 100 further comprises a third electronic device 106. The third electronic device 106 is also associated with the same user as the first electronic device 102 and the second electronic device 104. The implementation of the third electronic device 106 is also not particularly limited, but as an example, the third electronic device 106 may be implemented as a personal computer (desktops, laptops, netbooks, etc.), a wireless electronic device (a cell phone, a smartphone, a tablet and the like), as well as network equipment (a router, a switch, or a gateway). Merely for the purposes of an illustration, it shall be assumed that the third electronic device 106 is implemented as a tablet, such as iPad 3™ provided by Apple Corporation.

The third electronic device 106 also comprises hardware and/or software and/or firmware (or a combination thereof) to execute the electronic messaging application 108.

For the purposes of illustrations provided herein below it shall be assumed that the user has the electronic messaging application 108 running on all three of the first electronic device 102, the second electronic device 104 and the third electronic device 106. It shall be further assumed that the user is logged in (or is otherwise authenticated) in all three instances of the electronic messaging application 108 running on all three of the first electronic device 102, the second electronic device 104 and the third electronic device 106.

All of the first electronic device 102, the second electronic device 104 and the third electronic device 106 are coupled to a communication network 114 via a respective instance of a communication link—namely, a communication link 112a, a communication link 112b and a communication link 112c.

In some non-limiting embodiments of the present technology, the communication network 114 can be implemented as the Internet. In other embodiments of the present technology, the communication network 114 can be implemented differently, such as any wide-area communication network, local-area communication network, a private communication network and the like.

How the communication link 112a, the communication link 112b and the communication link 112c are implemented is not particularly limited and will depend on how the associated one of the first electronic device 102, the second electronic device 104 and the third electronic device 106 is implemented.

Recalling that the first electronic device 102 can be implemented, in this example, as a laptop, the communication link 112a can be wireless (such as the Wireless Fidelity, or WiFi® for short, Bluetooth® or the like) or wired (such as Ethernet™ based connection). Recalling that the second electronic device 104 can be implemented, in this example, as a smartphone, the communication link 112b can be wireless—such as the Wireless Fidelity, or WiFi® for short, Bluetooth® or the like or cellular (such as 3G, LTE and the like). Recalling that the third electronic device 106 can be implemented, in this example, as a tablet, the communication link 112c can be wireless—such as the Wireless Fidelity, or WiFi® for short, Bluetooth® or the like or cellular (such as 3G, LTE and the like).

It should be expressly understood that implementations for the first electronic device 102, the second electronic device 104, the third electronic device 106, the communication link 112a, the communication link 112b, the communication link 112c, and the communication network 114 are provided for illustration purposes only. As such, those skilled in the art will easily appreciate other specific implementational details for the first electronic device 102, the second electronic device 104, the third electronic device 106, the communication link 112a, the communication link 112b, the communication link 112c, and the communication network 114. As such, by no means, examples provided herein above are meant to limit the scope of the present technology.

To enable the user of the first electronic device 102, the second electronic device 104 and the third electronic device 106 to execute the electronic messaging application 108, coupled to the communication network 114 is a electronic messaging server 116 (also, referred to for simplicity as the "server 116"). The electronic messaging server 116 can be implemented as a conventional computer server. In an example of an embodiment of the present technology, the electronic messaging server 116 can be implemented as a Dell™ PowerEdge™ Server running the Microsoft™ Windows Server™ operating system. Needless to say, the electronic messaging server 116 can be implemented in any other suitable hardware and/or software and/or firmware or a combination thereof. In the depicted non-limiting embodiment of present technology, the electronic messaging server 116 is a single server. In alternative non-limiting embodiments of the present technology, the functionality of the electronic messaging server 116 may be distributed and may be implemented via multiple servers.

The electronic messaging server 116 comprises hardware and/or software and/or firmware (or a combination thereof) to execute (i) an electronic message processing module 118 and (ii) a presence control module 120.

Generally speaking, the electronic message processing module 118 is configured to process electronic message exchanged between various users subscribed to the electronic messaging service provided by the electronic messaging server 116, such as the user of the first electronic device 102, the second electronic device 104 and the third electronic device 106. The term "subscribed" should not be interpreted to have any particular meaning and, as such, teachings of the present technology equally apply to both "free" and "paid for" messaging services. More specifically, the electronic message processing module 118 is configured to (i) receive outgoing electronic messages from a source user to a destination user; (ii) determine the identity of the destination user, based on an electronic address or any other suitable identifier; (iii) release the now incoming message towards an electronic device associated with the destination user based on the electronic address. Those skilled in the art will appreciate the various protocols and processing routines for processing electronic messages, based at least in part on the electronic message being processed.

The presence control module 120 can be configured to determine presence information associated with the user using the electronic messaging application 108 using the first electronic device 102, the second electronic device 104 and the third electronic device 106. Within embodiments of the present technology, the presence control module 120 can be configured to determine presence information associated with each respective instance of the electronic messaging application 108 executed on the first electronic device 102, the second electronic device 104 and the third electronic device 106 independently from the other instances of the electronic messaging application 108 executed on the first electronic device 102, the second electronic device 104 and the third electronic device 106.

In some embodiments of the present technology, the presence control module 120 can be configured to determine presence information associated with each respective instance of the electronic messaging application 108 executed on the first electronic device 102, the second electronic device 104 and the third electronic device 106 without each of the respective instance of the electronic messaging application 108 executed on the first electronic device 102, the second electronic device 104 and the third electronic device 106 having to actively report their presence status to the presence control module 120.

Generally speaking, the presence control module 120 can be configured to determine the presence information associated with each respective instance of the electronic messaging application 108 executed on the first electronic device 102, the second electronic device 104 and the third electronic device 106 by analyzing a respective activity parameter associated with the each respective instance of the electronic messaging application 108 executed on the first electronic device 102, the second electronic device 104 and the third electronic device 106.

Within embodiments of the present technology, the presence control module 120 can be configured to retrieve the respective activity parameter from a user-activity-log 122. As depicted in FIG. 1, the presence control module 120 can be coupled to the user-activity-log 122 via a dedicated link (not numbered). Alternatively, the presence control module 120 can be coupled to the user-activity-log 122 via communication network 114.

The user-activity-log 122 is configured to maintain user activity information in respect to execution of the electronic messaging application 108 on the first electronic device 102, the second electronic device 104 and the third electronic device 106. More specifically, the presence control module 120 can appreciate and store in the user-activity-log 122 a respective activity parameter associated with the execution of the electronic messaging application 108 on the first electronic device 102, the second electronic device 104 and the third electronic device 106. In some embodiments, the activity parameter includes an indication of a user-action and an associated time stamp.

Within the implementations of the present technology, the user-action can include (but not limited to): (i) user reading the incoming electronic message, (ii) user creating a reply to the incoming electronic message, (iii) user managing the incoming electronic message, such as deleting the incoming electronic message, moving the incoming electronic message to a folder, creating a flag associated with the incoming electronic message and the like, (iv) user clicking on or otherwise actuating a pop-up message generated in association with the incoming electronic message on the associated one of the first electronic device 102, the second electronic device 104 and the third electronic device 106. It should be expressly understood, that any other kind and/or any other number of user-actions indicative of the user activity within the electronic messaging application 108 (or, otherwise, indicative of the user having appreciated the user notification or the user having read the incoming electronic message) can be used for determining the activity parameter.

In some embodiments of the present technology, the presence control module 120 observes the incoming and outgoing traffic associated with the electronic messaging application 108 executed by the respective one of the first electronic device 102, the second electronic device 104 and the third electronic device 106. Based on the analysis of the incoming and outgoing traffic, the presence control module 120 can appreciate the indications of the user-actions and store the associated activity parameters within the user-activity-log 122.

In alternative embodiments, in addition to the user-actions intercepted by the presence control module 120 based on the incoming and outgoing traffic, the respective ones of the first electronic device 102, the second electronic device 104 and the third electronic device 106 can report indications of certain user-actions to the presence control module 120. The user-actions tracked by the respective ones of the first electronic device 102, the second electronic device 104 and the third electronic device 106 can be different from the user-actions tracked directly by the presence control module 120. In some embodiments, the respective ones of the first electronic device 102, the second electronic device 104 and the third electronic device 106 can track so-called local user-actions, the local user-actions being un-trackable by the presence control module 120 (for example, these local user-actions can be invisible from the analysis of the incoming and outgoing traffic). Examples of the local user-actions can include but are not limited to: hovering a mouse, moving a mouse over the screen, selection of control keys on the keyboard, an action using a touch screen and the like.

In some embodiments of the present technology, the presence control module 120 can be configured to continuously monitor user-actions on the instances of the electronic messaging application 108 executed on the first electronic device 102, the second electronic device 104 and the third electronic device 106 and to maintain a log of user-activities, the log including an indication of the time stamp associated with the various user-actions. The purpose of maintaining the log of user-activities is to enable the presence control module 120 to determine a specific one of the instances of the electronic messaging application 108 executed on the first electronic device 102, the second electronic device 104 and the third electronic device 106 associated with the most recent user-action (i.e. the most recent active instance of the client).

As such, the presence control module 120 can access the user-activity-log 122 and to retrieve an indication of a first activity parameter associated with the first instance of the electronic messaging application 108 executed on the first electronic device 102, an indication of a second activity parameter associated with the second instance of the electronic messaging application 108 executed on the second electronic device 104 and an indication of a third activity parameter associated with the third instance of the electronic messaging application 108 executed on the third electronic device 106. The instances of the electronic messaging application 108 can be grouped together as being associated with the same user on the basis of a user identifier, such as user-credentials, user log in information and the like.

Naturally, in some alternative non-limiting embodiments of the present technology, the user-activity-log 122 can maintain fewer or more indications of the activity parameters.

Then, based on the so-retrieved first activity parameter, second activity parameter and the third activity parameter, the presence control module 120 can determine which instance of the electronic messaging application 108 executed on the first electronic device 102, the second electronic device 104 and the third electronic device 106 is associated with the latest (i.e. the most recent) user-activity. To illustrate, let it be assumed that the user has last used the second electronic device 104 to send and receive electronic messages using the electronic messaging application 108. Let it also be assumed that the user is currently logged in to all three instances of the electronic messaging application 108 executed on the first electronic device 102, the second electronic device 104 and the third electronic device 106.

Let it be assumed that the user-activity-log 122 stores the following indications of the user-activity.

<User A><Session 1><Device 1><Action: incoming message><Time: 12/08/2014 4:08:31 AM>
<User A><Session 2><Device 2><Action: outgoing message><Time: 12/08/2014 7:48:35 AM>
<User A><Session 3><Device 3><Action: delete message group><Time: 12/05/2014 5:14:06 PM>

Naturally, the above pseudo-code is provided as an example only. Those skilled in the art will appreciate the way the information is stored by the presence control module 120 can take many different forms and may have fewer or more of data elements contained therein.

Assuming that the current date and time is 12/08/2014 7:54:12 AM, the presence control module 120 can determine that the instance of the application associated with the latest user-activity is the one associated with the record <User A><Session 2><Device 2><Action: outgoing message><Time: 12/08/2014 7:48:35 AM>, which in this example is associated with the second electronic device 104.

In some embodiments, the presence control module 120 can maintain a preferences list indicative of a particular list of a particular order as to how the instances of the electronic messaging application 108 can be selected.

The preference list can be generated based on the analysis of past user interactions with various types of notifications. In other words, the presence control module 120 can determine, based on the type of the electronic message with which of the first electronic device 102, the second electronic device 104 and the third electronic device 106, the user is more likely (based on the past behaviour) to respond to the notification. Same applies mutatis mutandis to several client instances of the electronic messaging application 108 executed on the same one of the first electronic device 102, the second electronic device 104 and the third electronic device 106.

Alternatively (or additionally), the preference list can be pre-set by the user of the electronic messaging application 108. Yet in other examples, the preference list can be pre-set by an administrator of the electronic messaging server 116.

For example, using an example of an e-mail message, the user's past behaviour may be indicative of the following order of client instances or electronic devices (i.e. the first electronic device 102, the second electronic device 104 and the third electronic device 106):

<Level 1><web client>
<Level 2><IMAP client>
<Level 3><browser notification window>
<Level 4><e-mail apps>
<Level 5><mobile apps>

Naturally, the above number, order and type of the clients and client instances has been provided for illustration purposes only and can take other forms, such as with fewer or more elements of the same or of a different type.

Within these embodiments, the determination of which electronic device (i.e. the first electronic device 102, the second electronic device 104 and the third electronic device 106) is to be considered as the electronic device to be associated with the latest user-activity can be executed on the basis of the user-activity-log 122 and the preference list.

For the purposes of the illustration of the above, the following example will be used. Let it be assumed that the electronic messaging application 108 executed on the first electronic device 102 is a web browser tab hosting a web mail application. The electronic messaging application 108 executed on the second electronic device 104 is a mobile e-mail application. The electronic messaging application 108 executed on the third electronic device 106 is a web browser tab hosting a web mail application and an element of a browser (such as an event announcement drop-down window).

Let it be further assumed that the presence control module 120 has maintained the following preference list for the user associated with the first electronic device 102, the second electronic device 104 and the third electronic device 106:

<Level 1><web client>
<Level 2><browser notification window>
<Level 3><IMAP client>

Next, it will be assumed that the user-activity-log 122 maintains the following user-activity information in regard to the various instances of the electronic messaging application 108 executed on the first electronic device 102, the second electronic device 104 and the third electronic device 106:

<User A><Session 1—web browser tab 1><Device 1><Action: read messages><Time: 17:00> associated with the first electronic device 102

<User A><Session 2—mobile app><Device 2><Action: read messages><Time: 16:00> associated with the second electronic device 104

<User A><Session 3—web browser tab 2><Device 1><Action: delete message><Time: 13:00> associated with the first electronic device 102

<User A><Session 4—notification elements><Device 3><Action: notification sent><Time: unknown> associated with the third electronic device 106

Within some embodiments, the presence control module 120 can select the first tab of the web browser of the first electronic device 102 as a target device for sending an active notification to based on this instance of the electronic messaging application 108 being the most recently active one. In some embodiments, the presence control module 120 can select the second tab of the web browser of the first electronic device to send passive notifications.

In some embodiments, the presence control module 120 chooses all client instances of the same type as the one where the active notification being sent for sending the passive notification. In some embodiments, all the client instances of the same type are selected irrespective of which electronic device (i.e. the first electronic device 102, the second electronic device 104 and the third electronic device 106) the client instances of the same type are executed.

In other embodiments, only the client instances of the same type that are executed on the same electronic device (i.e. the first electronic device 102, the second electronic device 104 and the third electronic device 106) as the client instance which is selected for the active notification are selected.

Within other embodiments, the presence control module 120 can select the first tab of the web browser of the first electronic device 102 as a target device for sending an active notification to based on this instance of the electronic messaging application 108 being the most recently active one and the preference list. Within these embodiments, the combination of the preference list and the last activity parameter drive the selection of the first instance of the client to be sent the active user notification. For example, if it happens that the most recent active device is not associated with the top level of the preference list, the presence control module 120 may, in some embodiments, not select the most recent client instance, but rather select the most recently active instance of the client associated with the type listed at the tope of the preference list.

The presence control module 120 can then monitor if the user has interacted with the active notification. In some embodiments, the presence control module 120 can monitor user interaction only with the instance of the client to which the active notification has been sent (in this example, the first tab of the web browser executed on the first electronic device 102). In other embodiments, the presence control module 120 can monitor user interaction with any client instance of the electronic messaging application 108 executed on any of the first electronic device 102, the second electronic device 104 and the third electronic device 106. The latter approach assumes that as long as the user has interacted with any instance of the electronic messaging application 108 on any of the first electronic device 102, the second electronic device 104 and the third electronic device 106, the active notification can be deemed to have been appreciated in the sense of the user seeing and executing an action in respect to the active notification (i.e. actually appreciating the incoming electronic message).

In some embodiments of the present technology, the presence control module 120 can appreciate lack of action in respect to the active user notification. In some embodiments, the presence control module 120 can monitor user interaction only with the instance of the client to which the active notification has been sent (in this example, the first tab of the web browser executed on the first electronic device 102). For example, the presence control module 120 can monitor if the user has clicked or otherwise actuated the active user notification or if the user has otherwise performed any interaction with the electronic messaging application 108. In some embodiments, only a subset of possible user interactions with the electronic messaging application 108 can be selected as an indication that the user has actually appreciated the active user notification and, therefore, has appreciated the incoming electronic message (such as reply to the electronic message, delete the electronic message, move the electronic message can all be part of this example subset).

In other embodiments, the presence control module 120 can determine lack of user interaction based on lack of user interaction with the electronic messaging application 108 within any client instance of the electronic messaging application 108 executed on any of the first electronic device 102, the second electronic device 104 and the third electronic device 106.

Within these embodiments, the presence control module 120, after an expiration of a pre-determined period of time associated with lack of user interaction, can determine to send another instance of the active user notification. The presence control module 120 can determine the next temporal instance of user activity. Within the above-mentioned examples, the presence control module determines that next electronic device associated with user activity is the second electronic device 104. Hence, the presence control module 120 can determine to send another instance of the active user notification to the electronic messaging application 108 (a mobile app in this case), executed on the second electronic device 104.

The presence control module 120 can, of course, repeat the steps of awaiting an indication of user interaction with the electronic messaging application 108 much akin to what was described above. In case of lack of the indication of the user interaction within the pre-determined period of time, the presence control module 120 can repeat the steps of sending the active user notification to the remaining electronic devices, which within this example would be the notification elements of the third electronic device 106.

Given the architecture described above, it is possible to execute a method of processing an incoming electronic message destined to an application associated with a user, the user being associated with a first electronic device (such as one of the first electronic device 102, the second electronic device 104 and the third electronic device 106) and a second electronic device (such as another one of the first electronic device 102, the second electronic device 104 and the third electronic device 106), both the first electronic device and the second electronic device executing an instance of the application. The method can be executed at the presence control module 120.

Figure 2:
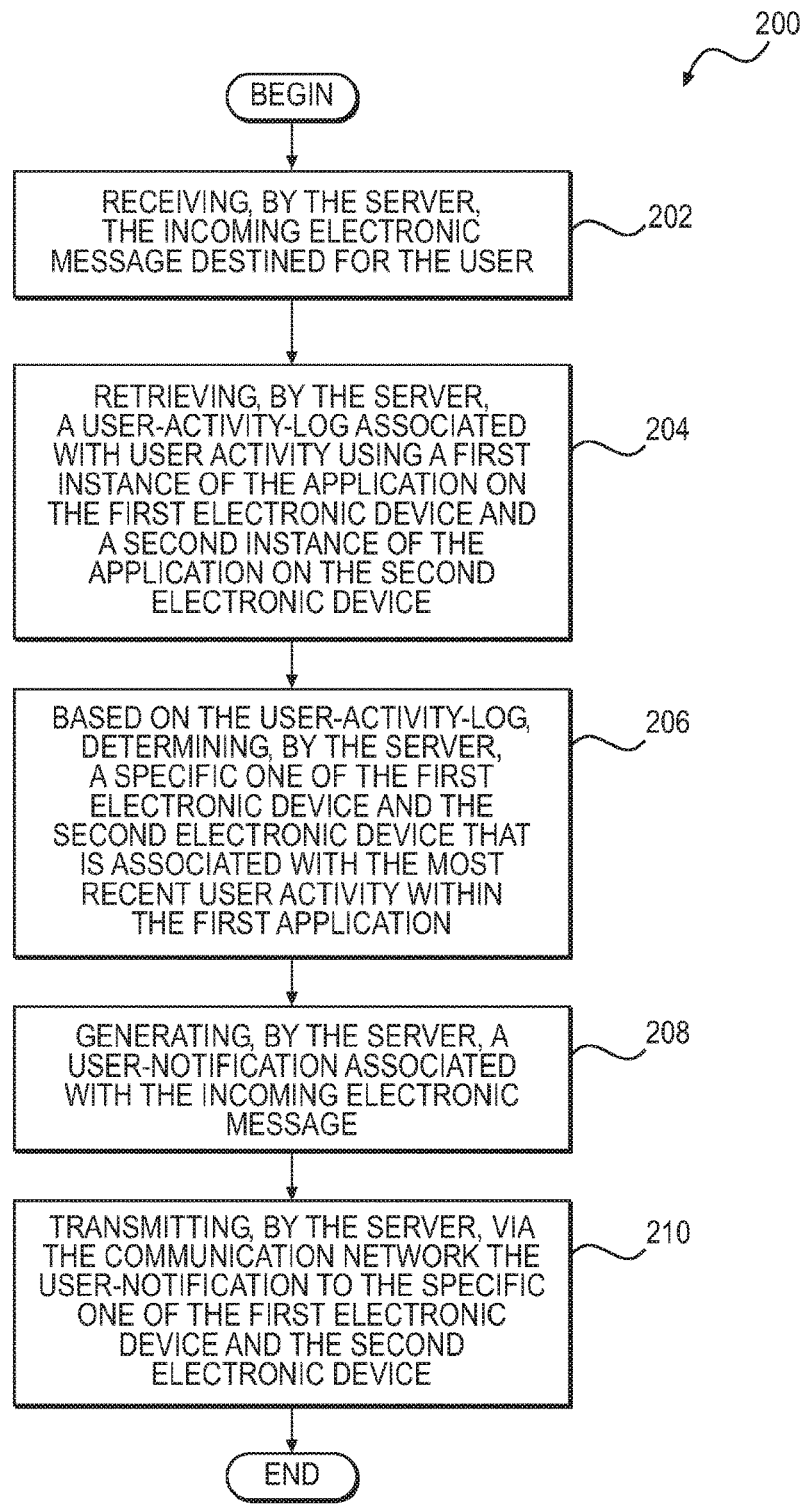
FIG. 2 depicts a block diagram showing a flow chart of a non-limiting embodiment of a method 200, the method 200 being executable with the system 100.

With reference to FIG. 2 there is depicted a non-limiting embodiment of a method 200.

Step 202—receiving, by the server, the incoming electronic message destined for the user The method 200 begins at step 202, where the electronic messaging server 116 receives the incoming electronic message destined for the user. More specifically, the electronic message processing module 118 receives an incoming electronic message, parses the <TO> field and determines the destination being the user (based on the electronic address or the like).

Step 204—retrieving, by the server, a user-activity-log associated with user activity using a first instance of the application on the first electronic device and a second instance of the application on the second electronic device Next, at step 204, the electronic messaging server 116 retrieves a user-activity-log associated with user activity using a first instance of the application on the first electronic device and a second instance of the application on the second electronic device.

More specifically, the presence control module 120 access the user-activity-log 122 and retrieves the user activity log, associated with the user identified as the recipient for the incoming electronic message, as part of step 202.

Step 206—based on the user-activity-log, determining, by the server, a specific one of the first electronic device and the second electronic device that is associated with the most recent user activity within the first application Next, at step 206, the electronic messaging server 116, based on the user-activity-log, determines a specific one of the first electronic device and the second electronic device that is associated with the most recent user activity within the first application.

Step 208—generating, by the server, a user-notification associated with the incoming electronic message Next, at step 208, the electronic messaging server 116 generates a user-notification associated with the incoming electronic message.

Step 210—transmitting, by the server, via the communication network the user-notification to the specific one of the first electronic device and the second electronic device Next, at step 210, the presence control module 120 transmits, via the communication network 114 the user-notification to the specific one of the first electronic device and the second electronic device.

Figure 3:
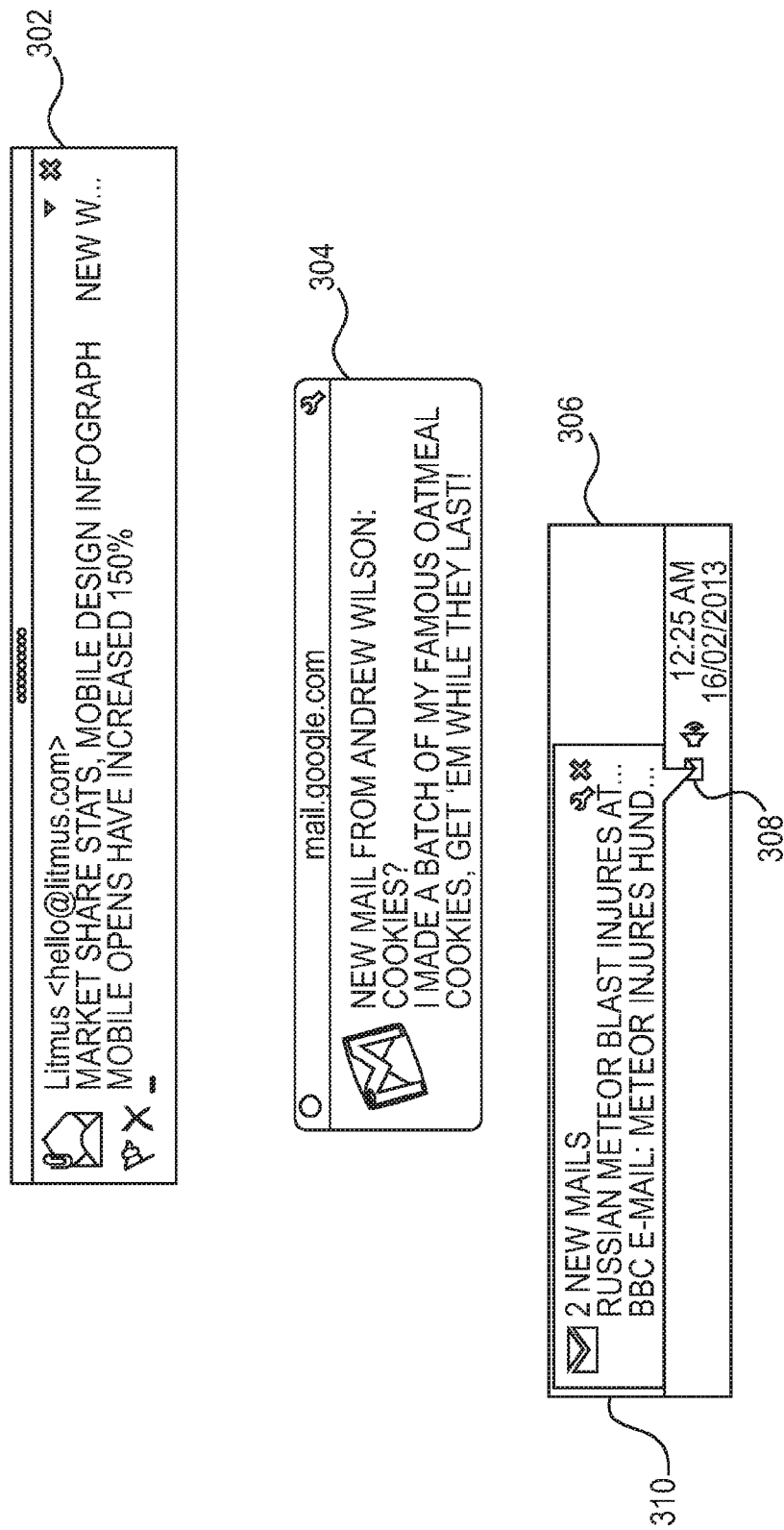
FIG. 3 depicts several examples of active notifications that can be provided in association of incoming electronic messages within execution of embodiments of the present technology.

In some embodiments of the present technology, the user-notification is an active user notification comprising (i) the incoming message and (ii) a trigger operable to cause the electronic device (the one of the first electronic device 102, the second electronic device 104 and the third electronic device 106 associated with the latest user-activity) to provide a notification of the incoming message to the user. The type of such user notification is not particularly limited. Naturally, the type of notification available will depend on the type of the electronic device (such as one of the first electronic device 102, the second electronic device 104 and the third electronic device 106). The user notification can be at least one of a visual notification and an audible notification. For example, the user notification on the second electronic device 104 can be visual, audible and tangible (i.e. vibration). Examples of how the active notification can trigger the electronic device to display the notification of the incoming electronic message have been depicted with reference to FIG. 3.

In some embodiments of the method 200, the method 200 further comprises transmitting, via the communication network 116, a second user-notification to another one of the first electronic device and the second electronic device, the second user-notification of a different type from the first user-notification.

Figure 4:
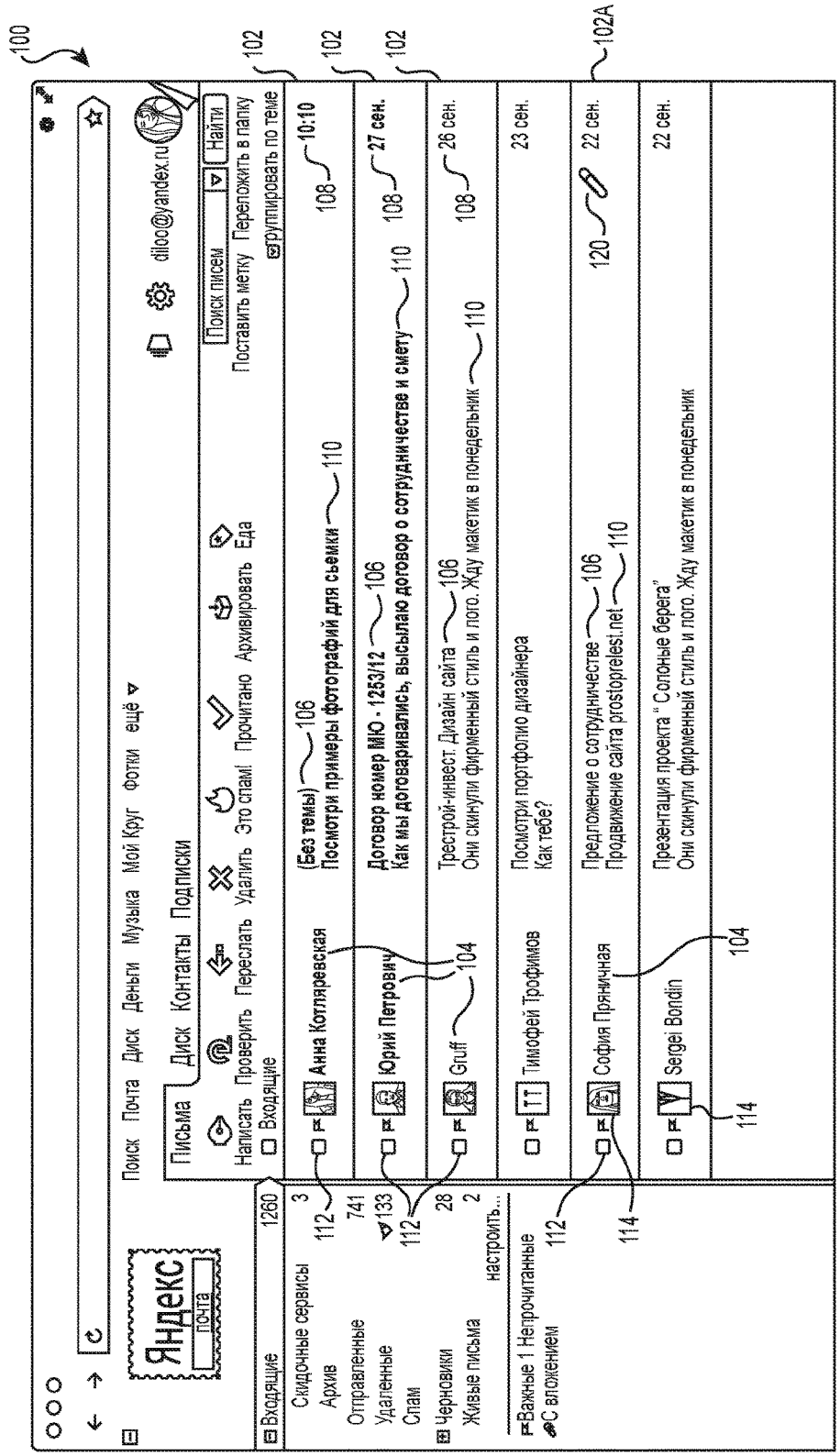
FIG. 4 is an example screenshot of a conventional webmail page illustrating one embodiment of passive notifications that can be provided within embodiments of the present technology.

As an example, the first user-notification can be of an active user notification type comprising (i) the incoming message and (ii) a trigger operable to cause the electronic device to provide a notification of the incoming message to the user and the second user-notification being a passive user notification comprising (i) the incoming message for background uploading to the application. The examples of how the passive user notification can be displayed is depicted with reference to FIG. 4.

In some embodiments, the method 200 further comprises maintaining, by the presence control module 120, the user-activity-log. As an example, the presence control module 120 can appreciate a first activity parameter associated with the first instance of the application and a second activity parameter associated with the second instance of the application. As has been aluded to before, the user activity can include one or more of: user logging into the electronic messaging application, user scrolling through the electronic messages using the electronic messaging application, replying to an electronic message in the electronic messaging application, deleting the electronic message in the electronic messaging application, organizing electronic messages in the electronic messaging application and the like.

In some embodiments of the present technology, the method 200 further comprises, responsive to an absence of an action in response to the user-notification, transmitting, a copy of the user-notification to another one of the first electronic device and the second electronic device (such as another one of the first electronic device 102, the second electronic device 104 and the third electronic device 106). In some implementations of the present technology, the absence of the action is determined in response to a lapse of a pre-determined period of time without the action in response to the user-notification. The pre-determined period of time can be 30 seconds, 1 minute, 2 minutes, 5 minutes and the like. This pre-determined period of time can be pre-set by an operator of the presence control module 120 or the user of the first electronic device 102, the second electronic device 104 and the third electronic device 106.

In some implementations, the copy of the user-notification is of the same type as the user-notification. For example, both the user-notification and the copy of the user notification comprise (i) the incoming electronic message and (ii) a trigger operable to cause the electronic device to provide a notification of the incoming electronic message to the user.

In other implementations, the copy of the user-notification is of a different type as the user-notification. For example, the user-notification is an active user notification comprising (i) the incoming electronic message and (ii) a trigger operable to cause the electronic device to provide a notification of the incoming electronic message to the user and the copy of the user-notification is a passive user notification comprising (i) the incoming electronic message for background uploading to the application.

In some embodiments of the present technology, the application is a first instance of the application executed on the most recently active electronic device (such as one of the first electronic device 102, the second electronic device 104 and the third electronic device 106). It is possible that the most recently active electronic device (such as one of the first electronic device 102, the second electronic device 104 and the third electronic device 106) may have another instance of the client application executed thereupon. Within these embodiments, the method 200 may further comprise, responsive to an absence of an action in response to the user-notification, transmitting, by the presence control module 120, a copy of the user-notification to the second instance of the client application executed on the same device (such as one of the first electronic device 102, the second electronic device 104 and the third electronic device 106).

Within these embodiments, the method 200 may further comprises, responsive to an absence of an action in response to the user-notification transmitted to the second instance of the application client, transmitting a copy of the user-notification to another one of the first electronic device and the second electronic device (such as another one of the first electronic device 102, the second electronic device 104 and the third electronic device 106).

In some implementations, the absence of an action is determined solely based on lack of action on the application executed on the specific one of the first electronic device and the second electronic device. Alternatively, the absence of an action is determined based on lack of action on both the application (of the same client instance) executed on the specific one of the first electronic device and the second electronic device and the application (of the same client instance) executed on the other one of the first electronic device and the second electronic device. In yet further alternatives, the absence of an action is determined based on lack of action on both the application (of any client instance) executed on the specific one of the first electronic device and the second electronic device and the application (of any client instance) executed on the other one of the first electronic device and the second electronic device.

In some implementations of embodiments of the present technology, the presence control module 120 may not be able to measure activity parameter associated with all and every client instance of the electronic messaging application 108 executed on the first electronic device 102, the second electronic device 104 and the third electronic device 106. For example, let's take an example of the electronic messaging application 108 being implemented as a notification panel of a browser. Typically, a portion of the notification panel can be associated with user's application and services. For example, the notification panel can provide an indication of unread or new electronic messages that are pending user's attention. In some implementations, the presence control module 120 may not be able to directly appreciate a user interaction with the notification panel. In some of these scenarios, the presence control module 120 can deem the user interactions with other instances of the electronic messaging application 108 as an indication of the user having appreciated the active user notification in regard to an incoming electronic message. In other implementations, the browser can send a signal to the presence control module 120 in response to the user clicking or otherwise actuating a section of the notification panel associated with the electronic messaging application 108.

In some embodiments of the present technology, it may so happen several active user notifications have been transmitted to the various instances of the electronic messaging application 108. In some of these embodiments of the present technology, upon the electronic messaging server 116 determining that the user has either read the new incoming message using one of the instances of the electronic messaging application 108 or has otherwise appreciated one of the instances of the active user notifications, the electronic messaging server 116 can cause the remainder of the instances of the electronic messaging application 108 to "extinguish" the other instances of the active user notifications on all instances of the electronic messaging application 108.

These embodiments of the present technology can have a particular technical advantage associated therewith in the sense that the user will not be presented with duplicate active user notifications.

In some alternative embodiments of the present technology, upon the electronic messaging server 116 determining that the user has either read the new incoming message using one of the instances of the electronic messaging application 108 or has otherwise appreciated one of the instances of the active user notifications, the electronic messaging server 116 can cause the remainder of the instances of the electronic messaging application 108 to "extinguish" the other instances of active and/or passive user notifications on all instances of the electronic messaging application 108. These embodiments of the present technology may also have a particular technical advantage associated therewith in the sense that the user will not be presented with duplicate active user notifications.

In alternative embodiments of the present technology, each instance of the active user notification can "expire" after a pre-determined period of time and can be ceased to be displayed locally by the respective instance of the electronic messaging application 108. The period of time can be pre-determined by the user, by the electronic messaging application 108 itself or by an administrator of the electronic messaging server 116.

In some embodiments of the present technology, the electronic messaging server 116 and the electronic messaging application 108 can be responsible for handling more than one kind of electronic messages. For example, GMAIL™ account allows the user to send and receive both e-mails and instant messages. Same goes for AOL™ service. Within some of these scenarios, instead of or in addition to the user activity parameter, the user-activity-log 122 (which in these scenarios can be thought of as a "user past-behaviour log") can maintain an indication of a delivery preference parameter associated with the user.

The delivery preference parameter can be indicative of user past-behaviour of which one of the first electronic device and the second electronic device (i.e. one of the first electronic device 102, the second electronic device 104 and the third electronic device 106) the user is more likely to process the incoming electronic message based on the message type of the incoming electronic message. In some embodiments of the present technology, the delivery preference parameter can have an auxiliary indicator indicative of the user's delivery preference based on an auxiliary parameter. The auxiliary parameter can be, for example, a type of the communication link the given electronic device is connected through. For example, the user may be more likely to read emails with larger attachments on the electronic device connected via WiFi rather than the same or a different electronic device connected through a wireless network.

As an example, the user-activity-log 122 can maintain the following delivery preferences parameters, which delivery preference parameters can be generated on the basis of observing user past interactions with various types of the electronic messaging application 108 executed on the first electronic device 102, the second electronic device 104 and the third electronic device 106 by the user:

<User 1><Type 1—email><second electronic device 104>

<User 1><Type 2—instant message><first electronic device 102>

<User 1><Type 3—VOIP call><third electronic device 106>

Accordingly, within these embodiments of the present technology, the electronic messaging server 116 can determine one of the first electronic device 102, the second electronic device 104 and the third electronic device 106 should be selected as the first electronic device to transmit the user notification, based on the delivery preferences parameters maintained in the user-activity-log 122. The user notification can be an active user notification.

Using above as an example, if it is determined that the incoming electronic message is an e-mail message, the electronic messaging server 116 determines that the active notification is to be sent, firstly, to the second electronic device 104. If, on the other hand, it is determined that the incoming electronic message is an instant message, the electronic messaging server 116 determines that the active notification is to be sent, firstly, to the first electronic device 102. Finally, if it is determined that the incoming electronic message is a VOIP call, the electronic messaging server 116 determines that the active notification is to be sent, firstly, to the third electronic device 106.

Once the electronic messaging server 116 determines which one of the first electronic device 102, the second electronic device 104 and the third electronic device 106 is to be used to send the first instance of the active user notification, the electronic messaging server 116 can also determine additional electronic devices to send the user notifications to (active or passive). The determination of the additional electronic devices to send the additional user notifications to can be determined similarly to what was described above.

Given the architecture described above, it is possible to execute a method of processing an incoming electronic message destined to an application associated with a user, the user being associated with a first electronic device (such as one of the first electronic device 102, the second electronic device 104 and the third electronic device 106) and a second electronic device (such as another one of the first electronic device 102, the second electronic device 104 and the third electronic device 106), both the first electronic device and the second electronic device executing an instance of the application. The method can be executed at the presence control module 120.

Figure 5:
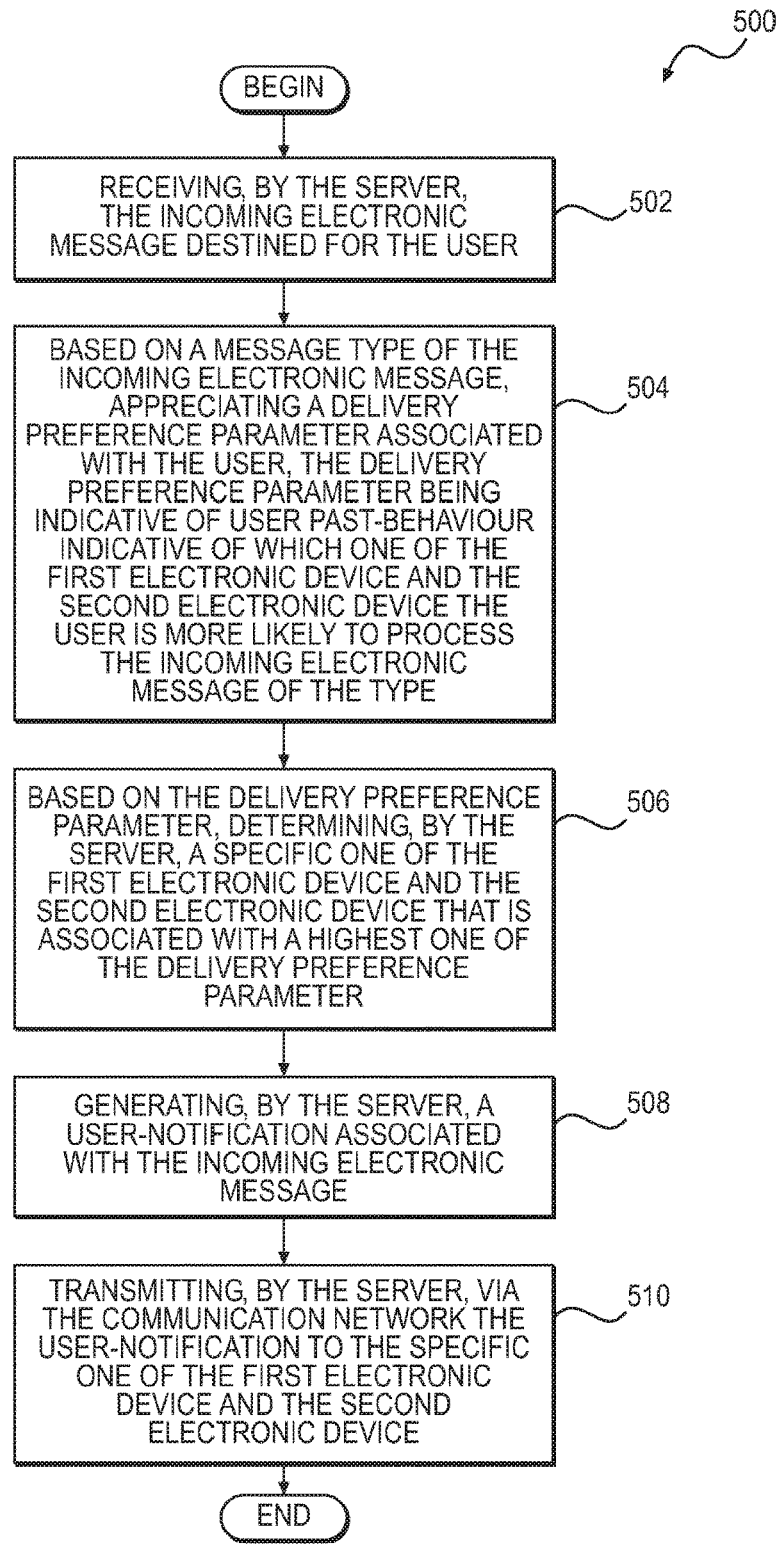
FIG. 5 depicts a block diagram showing a flow chart of a non-limiting embodiment of a method 500, the method 500 being executable with the system 100.

With reference to FIG. 5 there is depicted a flow chart of a method 500 implemented in accordance with non-limiting embodiments.

Step 502—receiving, by the server, the incoming electronic message destined for the user The method 500 starts at step 502, where the electronic messaging server 116 receives the incoming electronic message destined for the user. More specifically, the electronic message processing module 118 receives an incoming electronic message, parses the <TO> field and determines the destination being the user (based on the electronic address or the like).

Step 504—based on a message type of the incoming electronic message, appreciating a delivery preference parameter associated with the user, the delivery preference parameter being indicative of user past-behaviour indicative of which one of the first electronic device and the second electronic device the user is more likely to process the incoming electronic message of the message type Next, at step 504, the electronic messaging server 116, based on a message type of the incoming electronic message, appreciates a delivery preference parameter associated with the user, the delivery preference parameter being indicative of user past-behaviour indicative of which one of the first electronic device and the second electronic device the user is more likely to process the incoming electronic message of the message type.

Step 506—based on the delivery preference parameter, determining, by the server, a specific one of the first electronic device and the second electronic device that is associated with a highest one of the delivery preference parameter Next, at step 506, the electronic messaging server 116, based on the delivery preference parameter, determines a specific one of the first electronic device and the second electronic device that is associated with a highest one of the delivery preference parameter.

Step 508—generating, by the server, a user-notification associated with the incoming electronic message Next, at step 508, the electronic messaging server 116 generates a user-notification associated with the incoming electronic message.

Step 510—transmitting, by the server, via the communication network the user-notification to the specific one of the first electronic device and the second electronic device Next, at step 510, the electronic messaging server 116, transmits, via the communication network the user-notification to the specific one of the first electronic device and the second electronic device In some embodiments of the method 500, the user-notification is an active user notification comprising (i) the incoming message and (ii) a trigger operable to cause the electronic device to provide a notification of the incoming message to the user. The notification can be at least one of a visual notification and an audible notification.

In some embodiments of the method 500, the electronic messaging server 116 maintains a log of the user past-behaviour.

In some embodiments of the method 500, the electronic messaging server 116, responsive to an absence of an action in response to the user-notification, transmits a copy of the user-notification to another one of the first electronic device and the second electronic device. In some implementations, the absence of the action is determined in response to a lapse of a pre-determined period of time without the action in response to the user-notification.

In some embodiments of the method 500, the copy of the user-notification is of the same type as the user-notification.

In some embodiments of the method 500, both the user-notification and the copy of the user notification comprise (i) the incoming electronic message and (ii) a trigger operable to cause the electronic device to provide a notification of the incoming electronic message to the user.

In some embodiments of the method 500, the copy of the user-notification is of a different type as the user-notification.

In some embodiments of the method 500, the user-notification is an active user notification comprising (i) the incoming electronic message and (ii) a trigger operable to cause the electronic device to provide a notification of the incoming electronic message to the user and the copy of the user-notification is a passive user notification comprising (i) the incoming electronic message for background uploading to the application.

In some embodiments of the method 500, the application is a first application client, and the method 500 further comprises responsive to an absence of an action in response to the user-notification, transmitting, by the electronic messaging server 116, a copy of the user-notification to a second application client executed on the specific one of the first electronic device and the second electronic device.

In some embodiments of the method 500, the electronic messaging server 116, responsive to an absence of an action in response to the user-notification transmitted to the second application client, transmits a copy of the user-notification to another one of the first electronic device and the second electronic device.

In some embodiments of the method 500, the absence of an action is determined solely based on lack of action on the first application client and the second application client executed on the specific one of the first electronic device and the second electronic device.

In some embodiments of the method 500, the absence of an action is determined based on lack of action on both the first application client and the second application client executed on the specific one of the first electronic device and the second electronic device and the application executed on the other one of the first electronic device and the second electronic device.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of processing an incoming electronic message destined to an application associated with a user, the user being associated with a first electronic device and a second electronic device, both the first electronic device and the second electronic device executing at least one instance of the application, the method being executable at a server being responsible for handling incoming electronic messages for the application, the method comprising:
   receiving, by the server, the incoming electronic message destined for the user;
   based on a message type of the incoming electronic message, determining a delivery preference parameter associated with the user, the delivery preference parameter being indicative of user past-behaviour indicative of which one of the first electronic device and the second electronic device the user is more likely to process the incoming electronic message of the message type;
   based on the delivery preference parameter, determining, by the server, a specific one of the first electronic device and the second electronic device that is associated with a highest one of the delivery preference parameter, the at least one instance of the application of the specific one being a first instance of the application and a second instance of the application, both the first instance and the second instance being executed by the specific one, both the first instance and the second instance being capable of receiving the incoming electronic message;
   based on the delivery preference parameter, determining, by the server, a specific one of the first instance of the application and the second instance of the application the user is more likely to use to process the incoming electronic message;
   generating, by the server, a user-notification associated with the incoming electronic message;
   transmitting, by the server, via the communication network the user-notification to the specific one of the first instance of the application and the second instance of the application; and
   responsive to an absence of an action in response to the user-notification, transmitting, by the server, a copy of the user-notification to an other one of the first instance of the application and the second instance of the application, the absence of the action being determined in response to a lapse of a pre-determined period of time without the action in response to the user-notification.

2. The method of claim 1, wherein the user-notification is an active user notification comprising (i) the incoming message and (ii) a trigger operable to cause the electronic device to provide a notification of the incoming message to the user.

3. The method of claim 2, wherein the notification is at least one of a visual notification and an audible notification.

4. The method of claim 1, further comprising maintaining, by the server, a log of the user past-behaviour.

5. The method of claim 1, wherein the copy of the user-notification is of the same type as the user-notification.

6. The method of claim 5, wherein both the user-notification and the copy of the user notification comprise (i) the incoming electronic message and (ii) a trigger operable to cause the electronic device to provide a notification of the incoming electronic message to the user.

7. The method of claim 1, wherein the copy of the user-notification is of a different type as the user-notification.

8. The method of claim 7, wherein the user-notification is an active user notification comprising (i) the incoming electronic message and (ii) a trigger operable to cause the electronic device to provide a notification of the incoming electronic message to the user and the copy of the user-notification is a passive user notification comprising (i) the incoming electronic message for background uploading to the application.

9. The method of claim 1, the method further comprising:
   responsive to an absence of an action in response to the user-notification transmitted to the other one of the first instance of the application and the second instance of the application, transmitting, by the server, a copy of the user-notification to an other one of the first electronic device and the second electronic device.

10. The method of claim 9, wherein:
the absence of an action is determined solely based on lack of action on the specific one of the first instance of the application and the second instance of the application and the other one of the first instance of the application and the second instance of the application executed on the specific one of the first electronic device and the second electronic device.

11. The method of claim 9, wherein:
the absence of an action is determined based on lack of action on both the specific one of the first instance of the application and the second instance of the application and the other one of the specific one of the first instance of the application and the second instance of the application executed on the specific one of the first electronic device and the second electronic device and a third instance of the application executed on the other one of the first electronic device and the second electronic device.

12. A server comprising:
a communication interface for communication with an electronic device via a communication network,
a processor operationally connected with the communication interface, the processor configured to process an incoming electronic message destined to an application associated with a user, the user being associated with a first electronic device and a second electronic device, both the first electronic device and the second electronic device executing at least one instance of the application, the processor being further configures to:
receive the incoming electronic message destined for the user;
based on a message type of the incoming electronic message, to determine a delivery preference parameter associated with the user, the delivery preference parameter being indicative of user past-behaviour indicative of which one of the first electronic device and the second electronic device the user is more likely to process the incoming electronic message of the message type, the at least one instance of the application of the specific one being a first instance of the application and a second instance of the application, both the first instance and the second instance being executed by the specific one, both the first instance and the second instance being capable of receiving the incoming electronic message;
based on the delivery preference parameter, determining, by the server, a specific one of the first instance of the application and the second instance of the application the user is more likely to use to process the incoming electronic message;
based on the delivery preference parameter, to determine a specific one of the first electronic device and the second electronic device that is associated with a highest one of the delivery preference parameter;

generate a user-notification associated with the incoming electronic message;
transmit, via the communication interface, the user-notification to the specific one of the first instance of the application and the second instance of the application; and
responsive to an absence of an action in response to the user-notification, transmit a copy of the user-notification to an other one of the first instance of the application and the second instance of the application, the absence of the action being determined in response to a lapse of a pre-determined period of time without the action in response to the user-notification.

13. The server of claim 12, wherein the user-notification is an active user notification comprising (i) the incoming message and (ii) a trigger operable to cause the electronic device to provide a notification of the incoming message to the user.

14. The server of claim 13, wherein the notification is at least one of a visual notification and an audible notification.

15. The server of claim 12, the processor being further operable to maintain a log of the user past-behaviour.

16. The server of claim 12, wherein the copy of the user-notification is of the same type as the user-notification.

* * * * *